United States Patent
Goswami et al.

(10) Patent No.: US 7,133,777 B2
(45) Date of Patent: Nov. 7, 2006

(54) METHOD FOR TRANSMITTING WELLBORE DATA ACQUIRED IN THE WELLBORE TO THE SURFACE

(75) Inventors: Jaideva C. Goswami, Houston, TX (US); Ashok Srivastava, Haryana (IN); Denis Heliot, Sugar Land, TX (US); Thomas J. Neville, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 125 days.

(21) Appl. No.: 10/711,242

(22) Filed: Sep. 3, 2004

(65) Prior Publication Data
US 2005/0240349 A1    Oct. 27, 2005

Related U.S. Application Data

(60) Provisional application No. 60/565,318, filed on Apr. 26, 2004.

(51) Int. Cl.
*G01V 1/00* (2006.01)
(52) U.S. Cl. .......................... 702/6; 340/855.7
(58) Field of Classification Search .................. 702/6, 702/14, 17; 703/10
See application file for complete search history.

(56) References Cited

U.S. PATENT DOCUMENTS

| | | | |
|---|---|---|---|
| 5,526,300 A | | 6/1996 | Holness |
| 5,812,963 A | * | 9/1998 | Schneider et al. ............ 702/17 |
| 5,955,966 A | | 9/1999 | Jeffryes et al. |
| 6,801,473 B1 | * | 10/2004 | Matteucci et al. ............ 367/47 |
| 6,829,538 B1 | * | 12/2004 | de Kok ........................ 702/17 |

FOREIGN PATENT DOCUMENTS

| | | |
|---|---|---|
| EP | 0019672 | 4/1984 |
| EP | 1428976 | 6/2004 |
| WO | WO1998/17894 | 4/1998 |

OTHER PUBLICATIONS

Testerman, J.D., "A Statistical Reservoir Zonation Technique," Journal of Petroleum Technology, pp. 889-892, Aug. 1962.
Ramakrishna, T.S. et al., "A Model-Based Interpretation Methodology for Evaluating Carbonate Reservoirs," SPE71704, pp. 1-15.
Nunnink, J.R.J., Large Scale Gaussian Mixture Modelling Using a Greedy Expectation Maximization Algorithm, M.S. Thesis, May 19, 2003, pp. 1-36.

\* cited by examiner

*Primary Examiner*—Donald McElheny, Jr.
(74) *Attorney, Agent, or Firm*—Kevin P. McEnaney; Bryan L. White; Victor H. Segura (57) ABSTRACT

A method and apparatus are useful for decomposing a complex distribution of data by modeling the complex distribution as a sum of discrete simple distributions, and processing the simple distributions independently. The independent processing enables the complex distribution to be reconstructed without the simple distributions that are concluded to be spurious. The simple distributions preferably include one or more statistical distributions that are subject to being characterized by a reduced data set for efficient communication and reconstruction of the complex distribution. The modeling and processing steps preferably employ one or more evolutionary algorithms.

4 Claims, 11 Drawing Sheets

METHOD FOR TRANSMITTING WELLBORE DATA ACQUIRED IN THE WELLBORE TO THE SURFACE

BACKGROUND OF THE INVENTION

1. Field of the Invention

The present invention relates to processing of data sets, and more particularly to the decomposition of complex data sets for use in interpreting well logging data produced in hydrocarbon prospecting.

2. Background of the Related Art

Classification of well log data based on some petrophysically meaningful properties is an important aspect of formation evaluation. Many petrophysical parameters (e.g. porosity, fracture spacing) have complex distributions that are often the result of several natural phenomena or physical processes superimposing themselves on each other (e.g., grain interpososity+vug porosity, multiple fracture sets from different geological events). Log data provides a means for measuring the complex distributions (e.g., porosity distributions from logging data recorded by Schlumberger's FMI and CMR tools), but the discrete phenomena, processes, etc. that make up such complex distributions are difficult to extract.

A method is therefore needed for decomposing complex distributions into a set of underlying simpler components that can be individually processed.

SUMMARY OF THE INVENTION

In one aspect, the present invention provides a method of decomposing a complex distribution of data, including the steps of modeling the complex distribution as a sum of discrete simple distributions, and processing the simple distributions independently. It will be appreciated by those skilled in the art that the processing step may include, e.g., storing, updating, manipulating (i.e., selectively combining, rearranging, and/or excluding data), presenting, and interpreting the simple distributions independently.

In a particular embodiment of the inventive method, the processing step includes manipulating and interpreting the simple distributions independently, and the interpreting step includes identifying the simple distributions that are spurious. The complex distribution can then be reconstructed to advantage by summing the simple distributions that are not spurious.

The inventive method is applicable to various types of complex data distributions, including well logging data generated from measurements of one or more parameters of a subsurface formation. Such well logging data may include measurements that are representative of one or more natural phenomena, or one or more physical processes.

The simple distributions resulting from the modeling step may include one or more statistical distributions. In particular embodiments, the simple distributions can each be characterized by a reduced data set such as a data set consisting of an amplitude, a mean, and a standard deviation in the case of a normal distribution.

In another aspect, the present invention provides a method for transmitting measured wellbore data from a subsurface location to a surface location, including the step of modeling the measured wellbore data at the subsurface location as a sum of discrete simple distributions that are capable of being represented by a relatively small number of parameters. This is particularly true where such simple distributions are statistical distributions. The representative parameters can be easily transmitted from the subsurface location to a surface location. This enables the reconstruction of the measured wellbore data at the surface location using the transmitted parameters. Consequently, the data transmission efficiency can be greatly improved since only a few parameters need to be transmitted instead of the complete set of measured data.

In another aspect, the present invention provides a method of acquiring subsurface formation data, including the steps of disposing a formation evaluation tool in a wellbore penetrating a subsurface formation of interest, and acquiring formation data with the formation evaluation tool. The acquired formation data typically represents a complex data distribution that is capable of being modeled as a sum of discrete simple distributions that may be independently processed.

In a particular embodiment of the inventive method, the processing step includes manipulating and interpreting the simple distributions independently, and the interpreting step includes identifying the simple distributions that are spurious. The complex data distribution can then be reconstructed by summing the simple distributions that are not spurious. Additionally, a portion of the formation about the wellbore can be mapped as a function of vertical depth according to the simple distributions that are not spurious. Such vertical mapping can be repeated in one or more further wellbores penetrating the subsurface formation, thereby permitting the formation between the wellbores to be mapped by interpolating between the respective wellbore-formation maps.

In another aspect, the present invention provides a method for acquiring subsurface formation data, including the step of conducting logging operations in a plurality of wellbores penetrating a subsurface formation of interest so as to acquire a plurality of formation data sets. Each of the acquired data sets represents a complex distribution of data that is capable of being modeled as a sum of discrete simple distributions. The simple distributions may then be processed independently.

In a particular embodiment according to this aspect of the inventive method, the processing step includes interpolating the simple distributions over the area between the plurality of wellbores so as to generate a 2D or 3D map of the simple distributions over at least a portion of the formation. The simple distributions are preferably each representative of a specific formation property.

In a further aspect, the present invention provides an apparatus for acquiring subsurface formation data, including a formation evaluation tool adapted for acquiring formation data while disposed in a wellbore penetrating a subsurface formation of interest. The formation data represents a complex data distribution. The apparatus is equipped with a means for modeling the complex distribution as a sum of discrete simple distributions, and a means for independently processing the simple distributions to identify the simple distributions that are spurious. In a particular embodiments, the inventive apparatus is further equipped with a means for reconstructing the complex distribution by summing the simple distributions that are not spurious.

In particular embodiments of the inventive apparatus, a means is operatively connected to the formation evaluation tool for characterizing each of the simple distributions with a substantially reduced data set, and a means is further operatively connected to the formation evaluation tool for transmitting the substantially reduced data sets to the surface from the wellbore location. The simple distributions preferably include one or more statistical distributions, such that each of the statistical distributions is capable of being characterized by a reduced data set. Thus, in the case of a normal distribution, the reduced data set consists of an amplitude, a mean, and a standard deviation.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
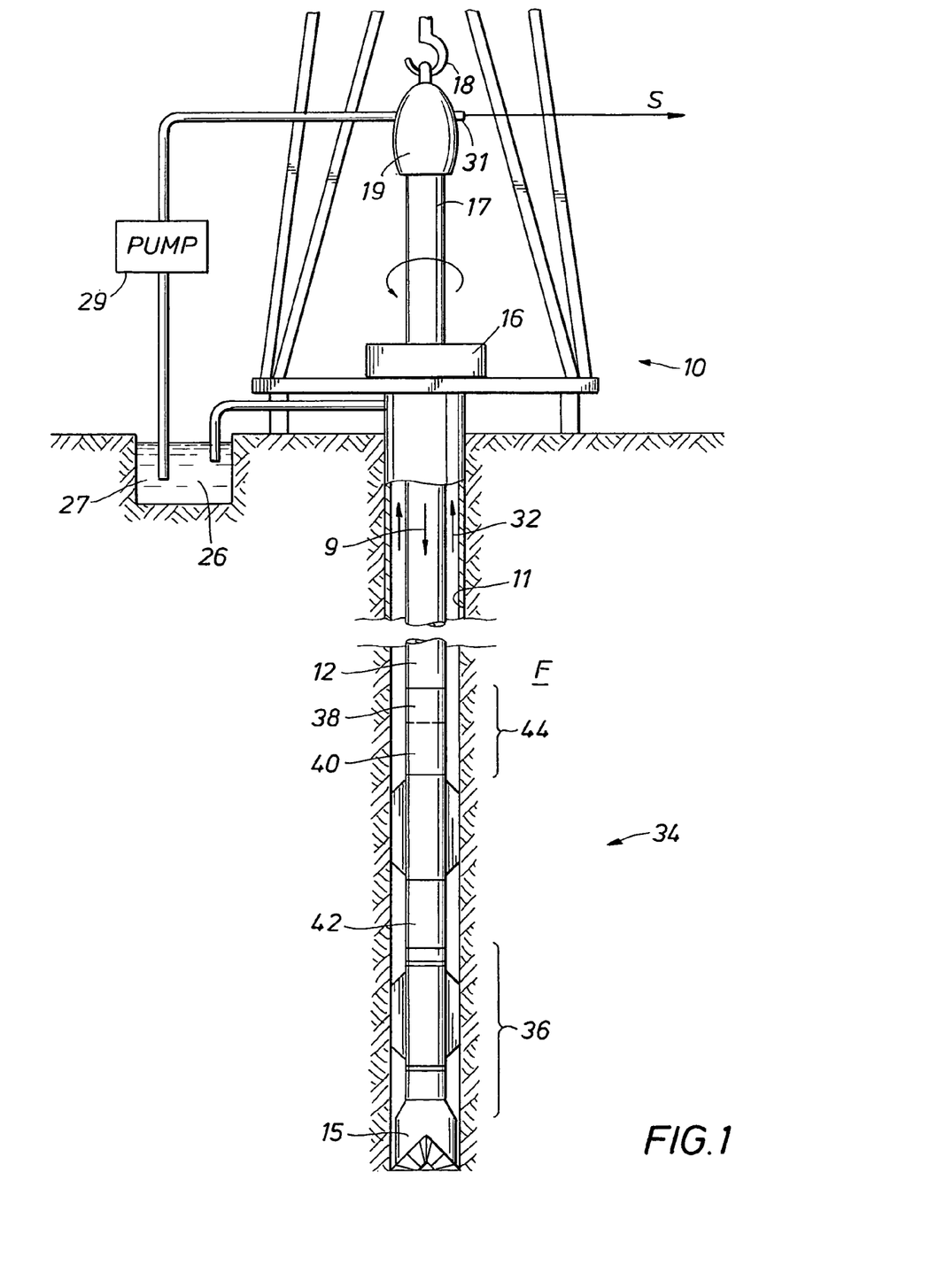
FIG. 1 is an elevational representation of a conventional rotary drilling string in which the present invention may be employed to advantage.

FIG. 1 illustrates a conventional drilling rig and drill string in which the present invention can be utilized to advantage. A land-based platform and derrick assembly 10 are positioned over a borehole 11 penetrating a subsurface formation F. In the illustrated embodiment, the borehole 11 is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs.

A drill string 12 is suspended within the borehole 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (also not shown), through the kelly 17 and a rotary swivel 19 which permits rotation of the drill string relative to the hook.

Drilling fluid, or mud, 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 9. The drilling fluid exits the drill string 12 via ports in the drill bit 15, and then circulates upwardly through the region between the outside of the drill string and the wall of the borehole, called the annulus, as indicated by the directional arrows 32. In this manner, the drilling fluid lubricates the drill bit 15 and carries formation cuttings up to the surface as it is returned to the pit 27 for recirculation.

The drill string 12 further includes a bottom hole assembly (BHA), generally referred to as 34, near the drill bit 15 (in other words, within several drill collar lengths from the drill bit). The bottom hole assembly 34 includes capabilities for measuring, processing, and storing information, as well as communicating with the surface. The BHA 34 thus includes, among other things, an apparatus 36 for determining and communicating one or more properties of the formation F surrounding borehole 11, such as formation resistivity (or conductivity), natural radiation, density (gamma ray or neutron), and pore pressure. Examples of such logging apparatuses include the Formation Microresistivity Imager (FMI) tool (a wireline-conveyed resistivity tool) and the Combinable Magnetic Resonance (CMR) tool (a wireline-conveyed nuclear magnetic resonance tool), both owned and offered through logging services by Schlumberger, the assignee of the present invention.

The BHA 34 further includes drill collars 42, 44 for performing various other measurement functions. Drill collar 44, in particular, houses a measurement-while-drilling (MWD) tool. The MWD tool includes a telemetry and power subassembly 38 that communicates with a similar system (not shown) at the earth's surface. In addition to providing power for telemetry means (described further below), the subassembly 38 communicates data/commands with, and provides power for, a sensor package 40 within the MWD tool. The sensor package 40 includes appropriate instrumentation for determining real-time drilling parameters such as direction, inclination, and toolface, among other things.

Figure 2:
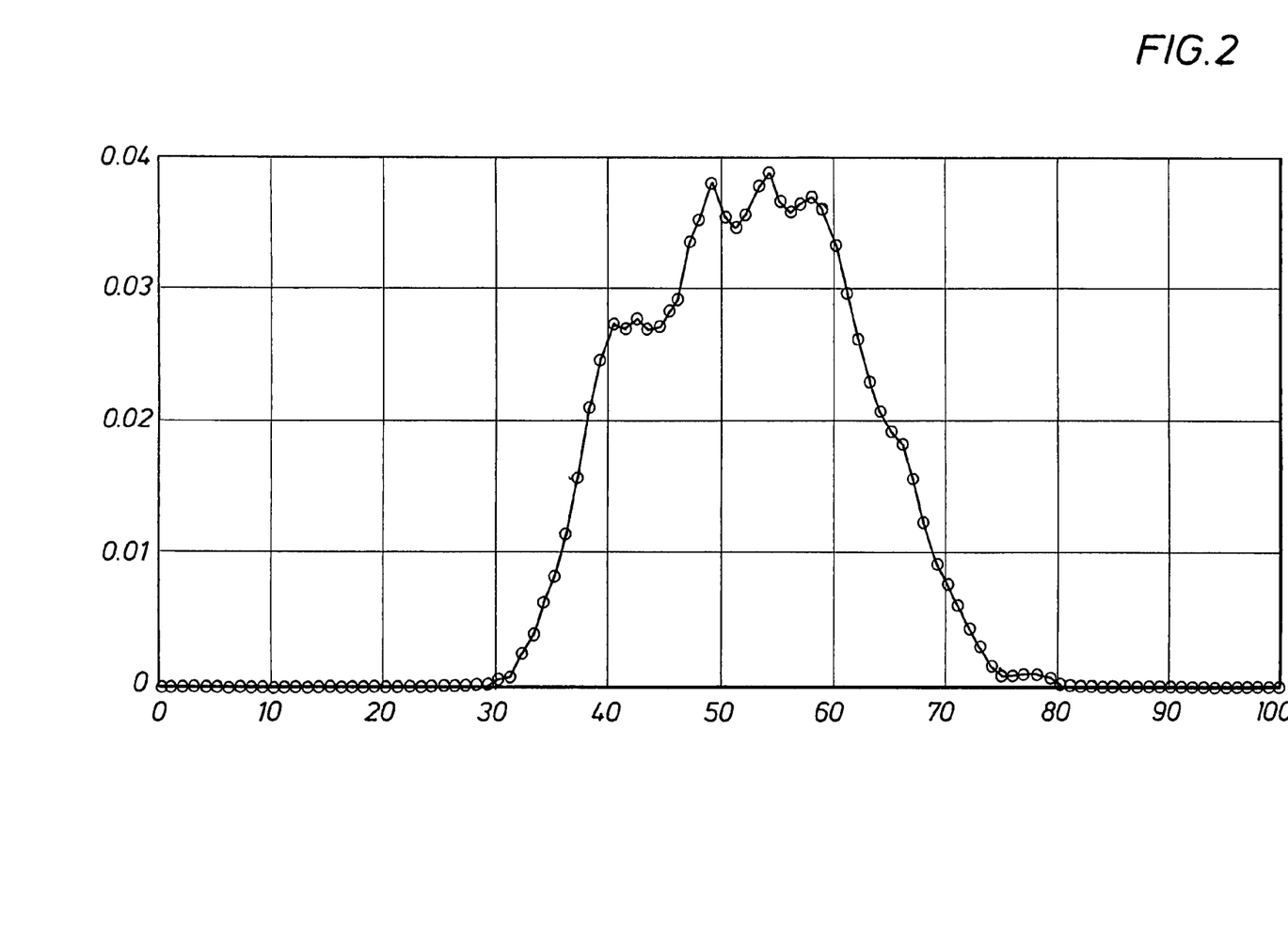
FIG. 2 is a complex distribution of porosity data obtained from a microresistivity logging tool.

FIG. 2 shows a complex distribution of porosity data obtained using Schlumberger's FMI tool (mentioned above). This distribution can be considered as a superposition of several (two or more) distributions, each corresponding to some type of pore configuration.

Figure 3:
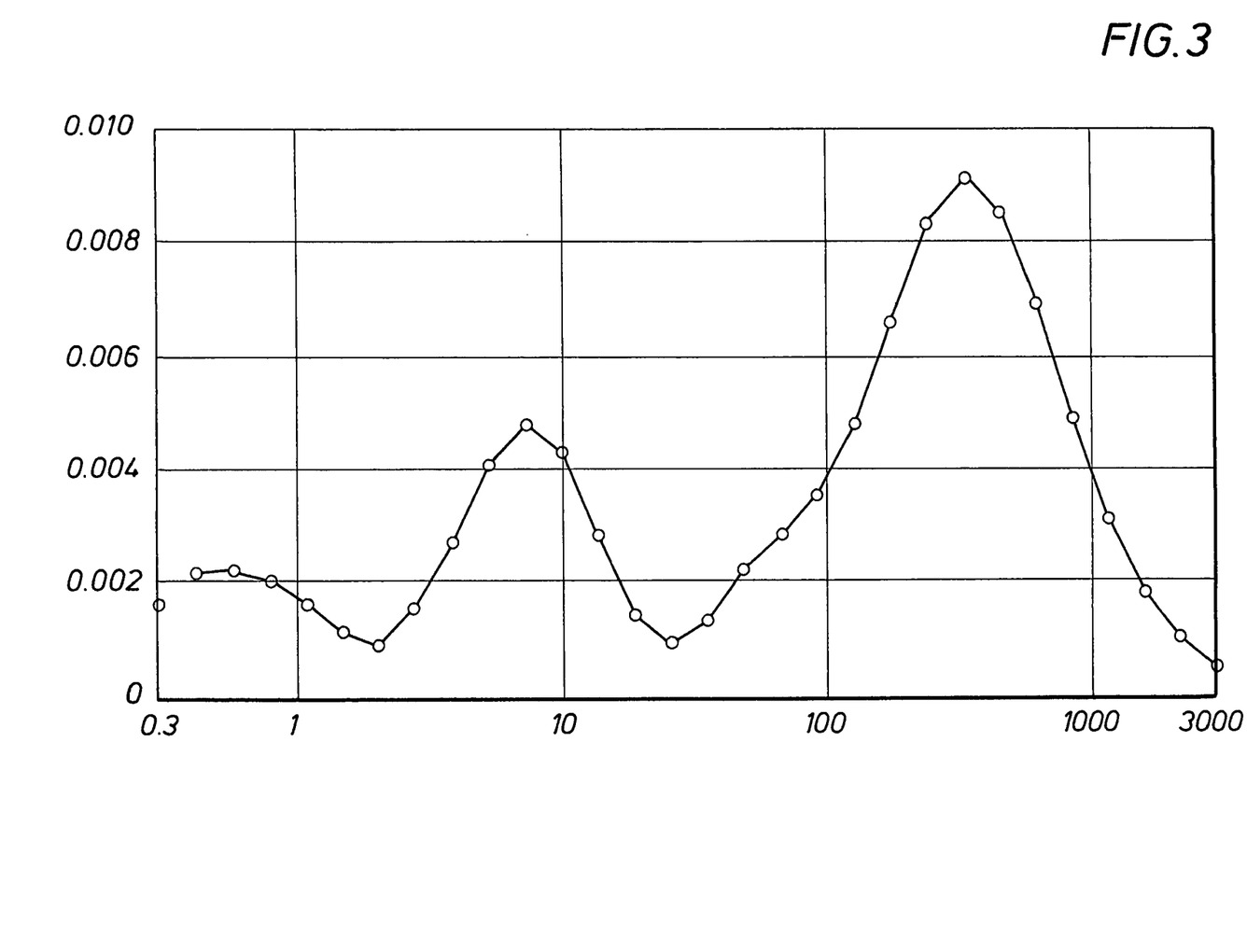
FIG. 3 is a complex distribution of transverse relaxation time ($T_2$) data obtained from a nuclear magnetic resonance logging tool.

FIG. 3 shows a complex distribution of transverse relaxation time ($T_2$) data obtained using Schlumberger's CMR nuclear magnetic resonance logging tool. The $T_2$ distribution for measured data is a combined response of a formation that may include various types of pores—meso, micro, macro, for example—as well as "bad hole" effects (e.g., unstable wellbore walls), and many other effects.

A decomposition of such complex data distributions into their respective constituents may provide valuable information about the formation being evaluated through the logging operations. For example, a measured data distribution like formation porosity can be analyzed by examining the underlying simpler distributions, such as matrix porosity and secondary porosity. Thus, in accordance with the present invention, a complex distribution of data is modeled as a sum of discrete simple distributions, and the simple distributions are processed independently. The processing step includes manipulating and interpreting the simple distributions independently. The interpreting step preferably includes identifying the simple distributions that are spurious, or not properly representative of the measured formation parameter(s). The complex distribution can then be reconstructed to advantage by summing the simple distributions that are not spurious.

For example, in cases where a $T_2$ distribution is believed to have "bad" regions (affected by a bad wellbore, for instance), the corresponding spurious component or measured artifact can be removed and a "clean" $T_2$ distribution can be reconstructed. Most of the current methods use hard-thresholding method to partition a given distribution. The present invention, however, provides an optimization-based method in which there is flexibility in selecting the shape of individual components. Furthermore, the inventive method offers over-lapping partitioning of individual components (see, e.g., FIG. 4) which may be physically more meaningful.

The inventive method may be illustrated by assuming the modeled simple distributions to be statistical distributions, and, more particularly, to be normal or Gaussian distributions. Accordingly, a given property distribution of complex data, f(x), can be modeled or approximated in terms of some simple or basis distributions $\{\Phi_n(x); n=1,2, \ldots N\}$ as:

$$f(x) \approx \tilde{f}(x) = \sum_{n=1}^{N} A_n \phi_n(x) \qquad (1)$$

where $\tilde{f}(x)$ is an approximation of f(x). If the simple or basis distribution is assumed to be normal (Gaussian), i.e.:

$$\phi_n(x) = \exp\left\{-\left(\frac{x - m_n}{s_n}\right)^2\right\} \qquad (2)$$

with $m_n$ and $s_n$ as mean and standard deviation, respectively, then Equation (1) can be explicitly written as:

$$\tilde{f}(x) = \sum_{n=1}^{N} A_n \exp\left\{-\left(\frac{x - m_n}{s_n}\right)^2\right\} \qquad (3)$$

Accordingly, one objective is to determine $\{A_n, m_n, s_n\}$ for $n=1, \ldots, N$ by minimizing the error between the approximate distribution $\tilde{f}(x)$ and the given (measured) distribution f(x).

Thus, e.g., a given complex data distribution, f, can be written as a superposition of Gaussian distributions according to Equation (3), and the objective is to determine $\{A_n, m_n, s_n\}$ for $n=1, \ldots, N$ from the known distribution. In other words, the simple distributions can each be characterized by a reduced data set such as a data set consisting of an amplitude, a mean, and a standard deviation in the case of a Gaussian distribution, and then plotted as part of a well log presentation. Such presentations can be useful for demonstrating how a given mechanism evolves with depth (e.g.: a matrix porosity/grain size changing with depth as part of a "thinning up" sequence), or demonstrating the overlap between the distributions.

An algorithm based on evolutionary optimization techniques has been developed that can automatically determine the number of Gaussians and then estimate various parameters. While the approach is very general, in the specific case of Gaussian distribution, the algorithm first determines the number of Gaussians simply by detecting the changes in the first derivatives. An initial range of amplitude, mean, and standard deviation is then provided to an optimization program which for the present case is of an evolutionary type.

Evolutionary algorithms are stochastic search methods that mimic the metaphor of natural biological evolution. Evolutionary algorithms operate on a population of potential solutions applying the principle of survival of the fittest to produce sequentially better and better approximations to a solution. At each generation, a new set of approximations is created by the process of selecting individuals according to their level of fitness in the problem domain and "breeding" them together using operators borrowed from natural genetics. This process leads to the evolution of populations of individuals that are better suited to their environment than the individuals that they were created from, just as in natural adaptation.

Evolutionary algorithms model natural processes, such as selection, recombination, mutation, migration, locality and neighborhood. Evolutionary algorithms work on populations of individuals instead of single solutions. In this way the search is performed in a parallel manner. Pseudo-code for a typical evolutionary algorithm EA (e.g., a genetic algorithm) follows:

TABLE 1

Pseudo-Code for Algorithm EA

```
Algorithm EA is
    // start with an initial time
        t := 0;
    // initialize a usually random population of individuals
        initpopulation P (t);
    // evaluate fitness of all initial individuals in population
        evaluate P (t);
    // test for termination criterion (time, fitness, etc.)
        while not done do
            // increase the time counter
                t := t + 1;
            // select sub-population for offspring production
                P' := selectparents P (t);
            // recombine the "genes" of selected parents
                recombine P' (t);
            // perturb the mated population stochastically
                mutate P' (t);
            // evaluate its new fitness
                evaluate P' (t);
            // select the survivors from actual fitness
                P := survive P, P' (t);
        od
    end EA.
```

A basic difference between an evolutionary-type and more traditional gradient-based methods (e.g., a Conjugate Gradient Method), is that in the former case the optimization proceeds with a number of points in the search space and continues to search in multiple directions, whereas in the latter case, the search begins with a single point and a single direction and remains so for the entire search procedure. Furthermore, transition from one iteration to the next is typically probabilistic in case of evolutionary algorithms while in case of a gradient-based method, the transition rules are deterministic. These properties make evolutionary algorithms robust for problems involving multimodal objective functions (i.e., the ones with several minima and maxima). Those skilled in the art and given the benefit of this disclosure will appreciate, however, that the present invention is not limited to Gaussian distributions, or even to statistical distributions.

The inventive method is applicable to various types of complex data distributions, including well logging data generated from measurements of one or more parameters of a subsurface formation. Such well logging data may include measurements having components that are representative of one or more natural phenomena, or one or more physical processes.

One clear benefit made possible by the present invention is the efficient communication of well logging information from a downhole logging tool to the surface of a wellbore. This benefit is realized by modeling the measured wellbore data at a subsurface location (e.g., using means on the logging tool or another adjacent tool in the tool string) as a sum of discrete simple distributions that are capable of being represented by a relatively small number of parameters. This is particularly true where such simple distributions are normal or Gaussian distributions, as mentioned above. The representative parameters can be easily transmitted from the subsurface location to a surface location using conventional telemetry means, enabling efficient real-time data transmission for LWD tools (as in FIG. 1). This enables the reconstruction of the measured wellbore data at the surface location using the transmitted parameters.

Figure 4:
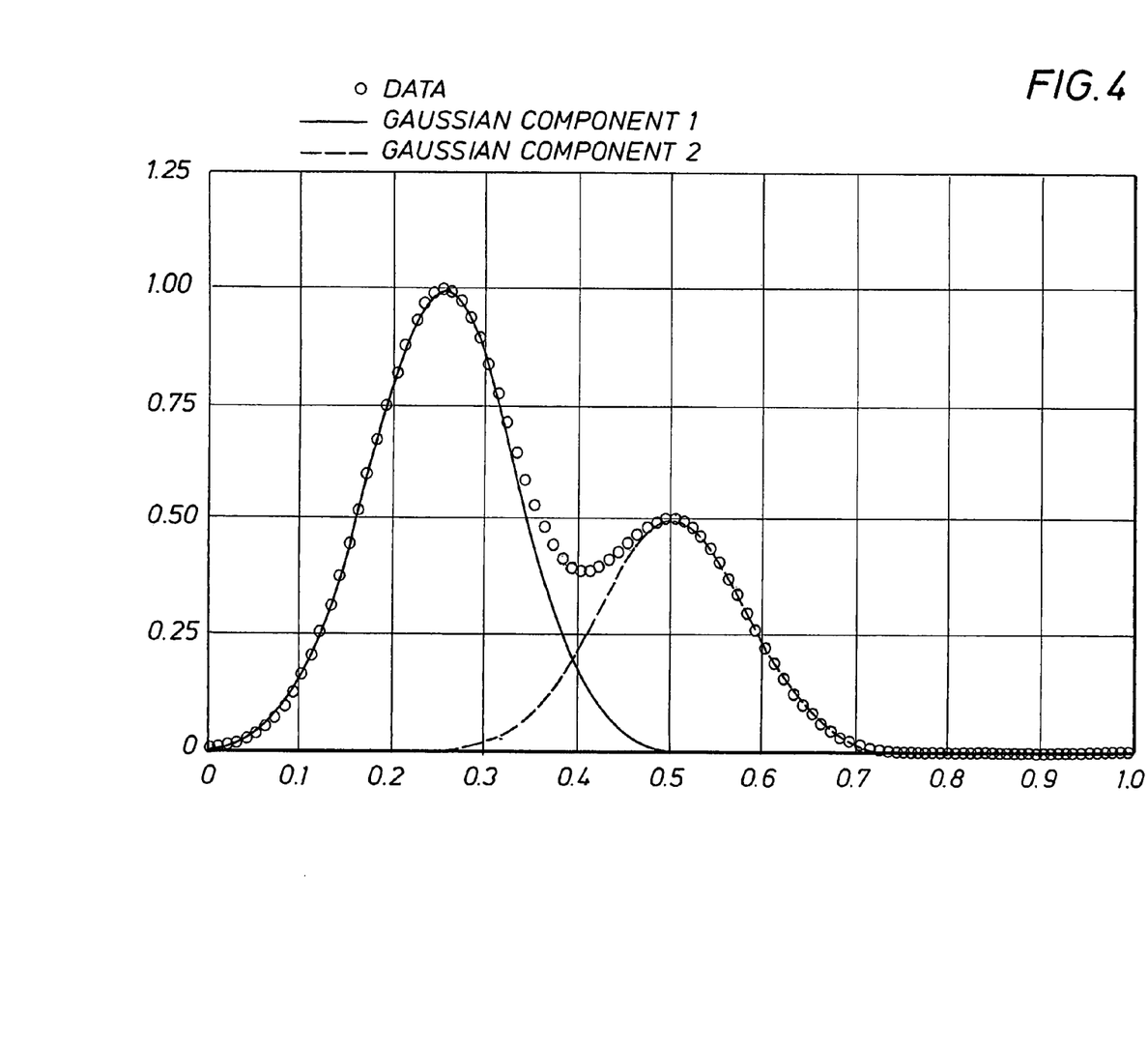
FIG. 4 shows modeling of a complex distribution of synthetic data by two simple, normal (Gaussian) distributions.

Example 1: FIG. 4 shows a modeling of a complex distribution of synthetic data by two simple, normal (Gaussian) distributions. Parameters for both components were determined by the above-mentioned optimization method.

Figure 5:
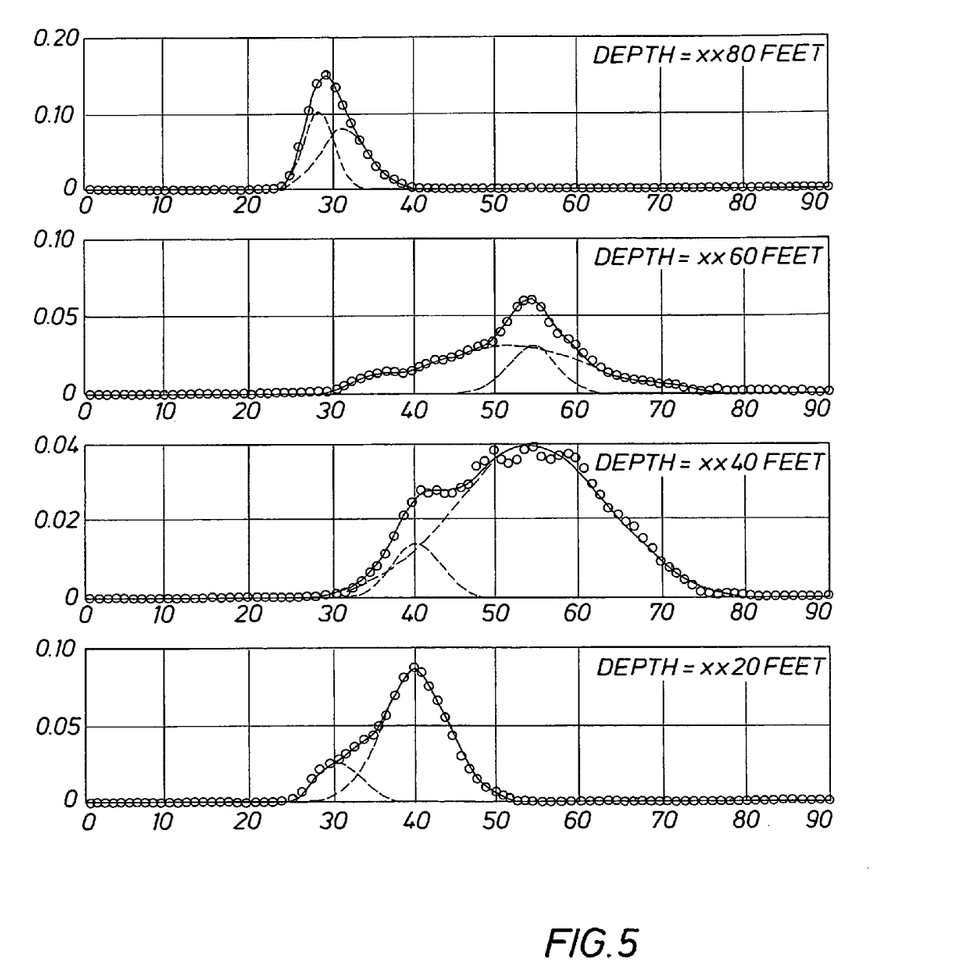
FIG. 5 shows a modeling of a complex distribution of measured porosity data by respective pairs of simple, normal (Gaussian) distributions, for various depths.

Example 2: FIG. 5 shows a modeling of a complex distribution of measured porosity data by respective pairs of simple, normal (Gaussian) distributions, for various depths.

Figure 6:
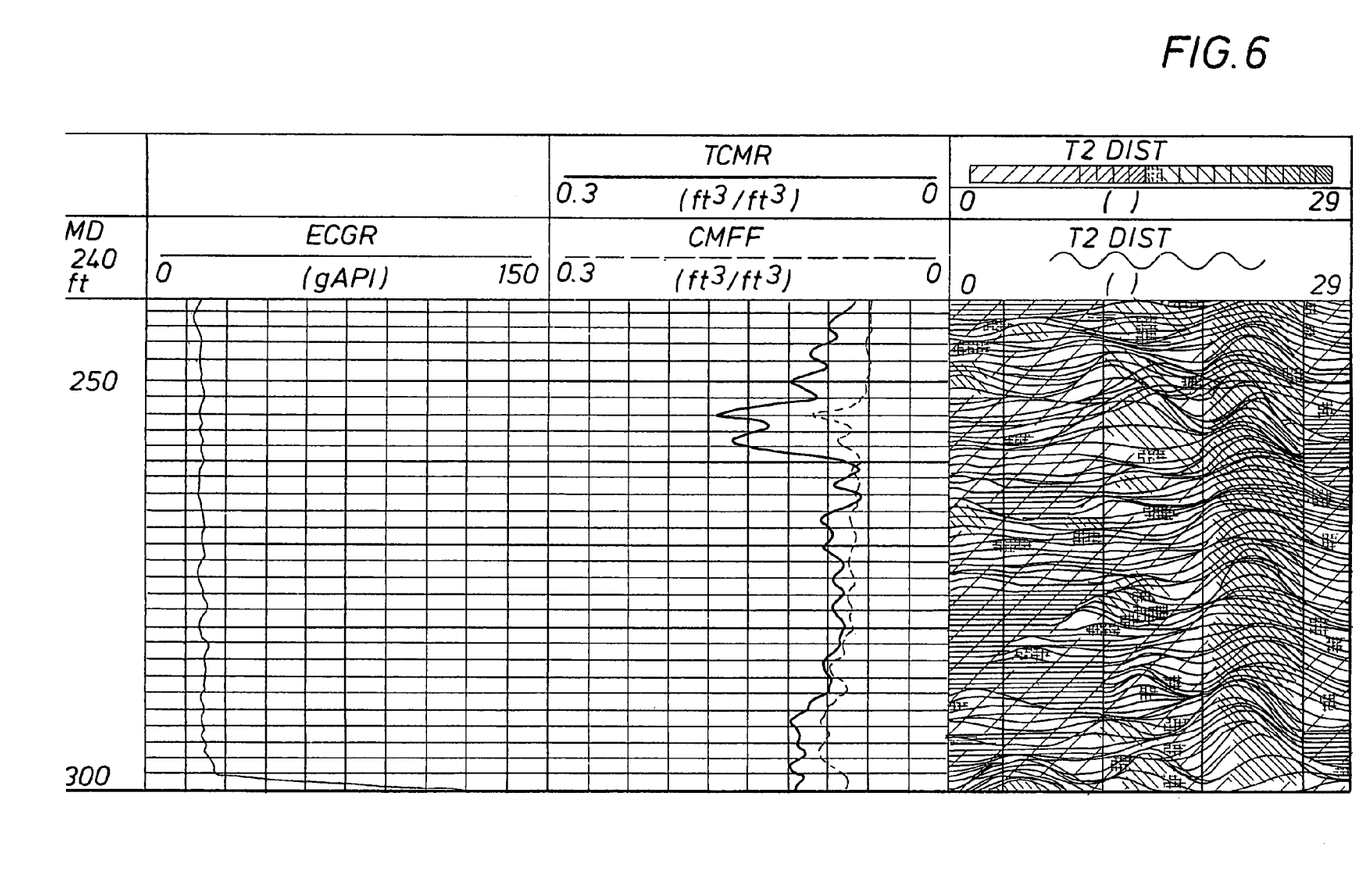
FIG. 6 shows another complex distribution of measured $T_2$ data, with the data being influenced by a "bad hole" condition over a particular depth range.

Example 3: FIG. 6 shows another complex distribution of measured $T_2$ data, with the data being influenced by a bad hole (e.g., unstable wellbore region) condition over a particular depth range. Specifically, the interval from 4240 feet to 4260 feet is affected by a bad hole, with a mud signal centered at around 30 msec in the $T_2$ distribution. Below 4260 feet, the data is good.

Figure 7:
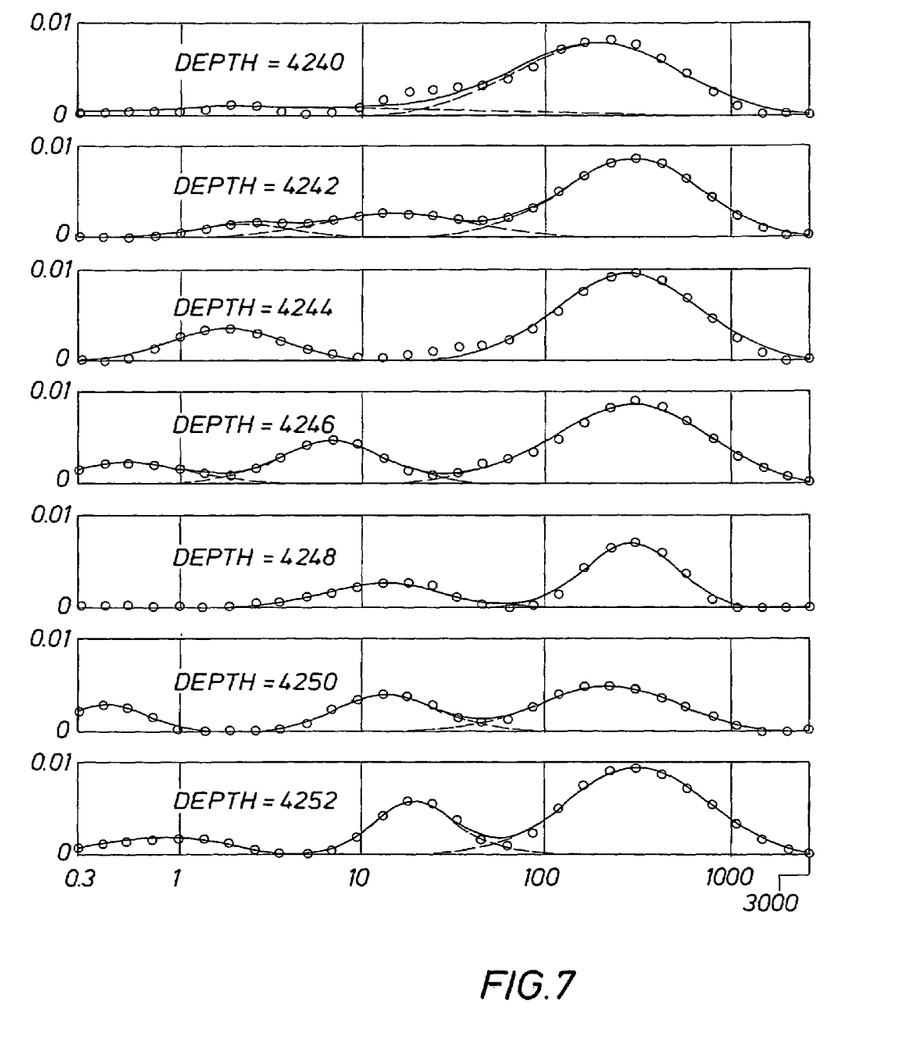
FIG. 7 shows the $T_2$ data of FIG. 6 being modeled by two or more simple, normal (Gaussian) distributions, for particular depths, according to the present invention.

FIG. 7 shows the $T_2$ data (circles) of FIG. 6 being modeled according to an optimization technique by two or more simple, normal (Gaussian) distributions, for particular depths, according to the present invention.

Figure 8A:
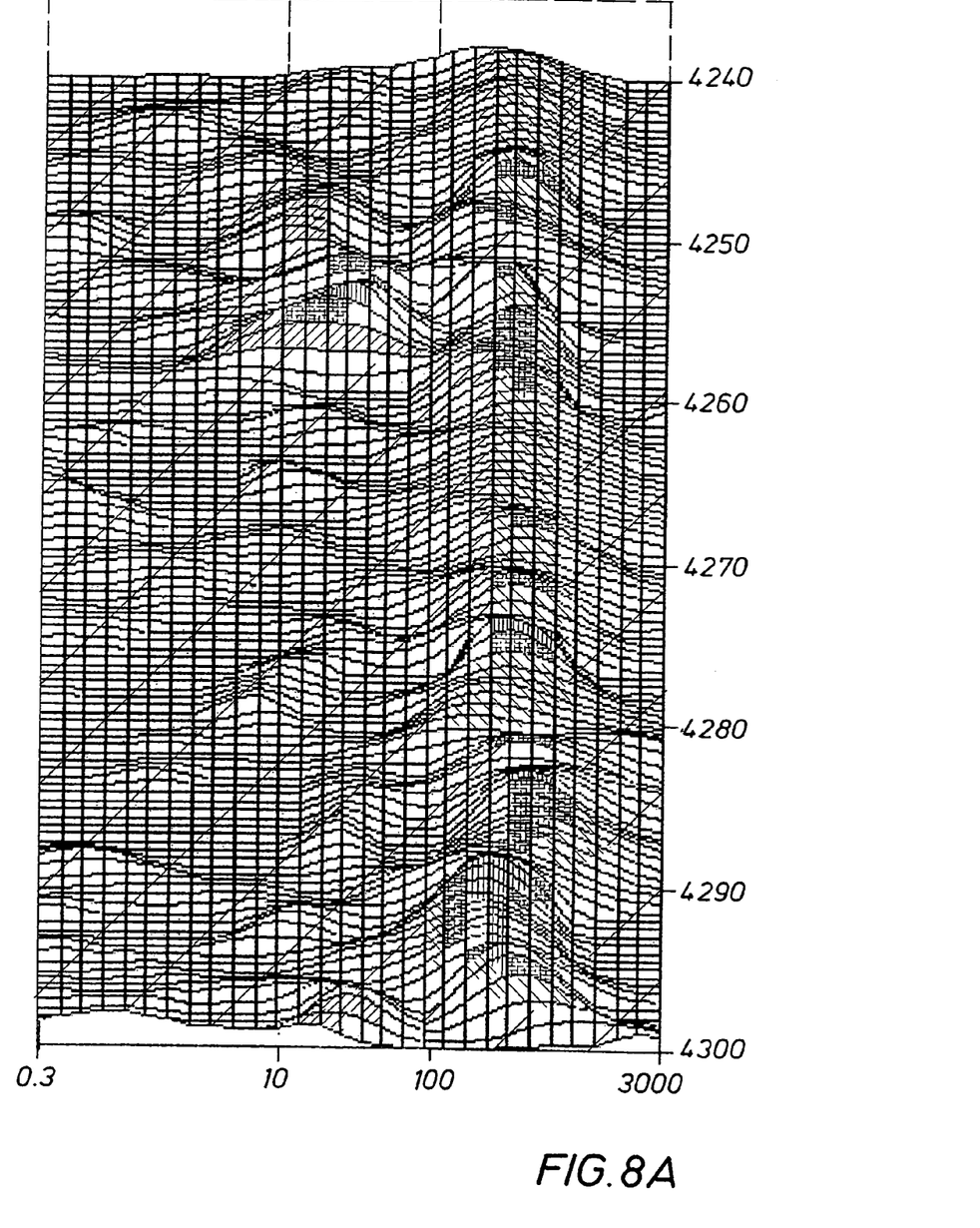
FIG. 8 shows a comparison of the complex distribution of FIG. 6 with a reconstructed distribution of the modeled, simple distributions that are not representative of the bad hole condition.
Figure 8B:
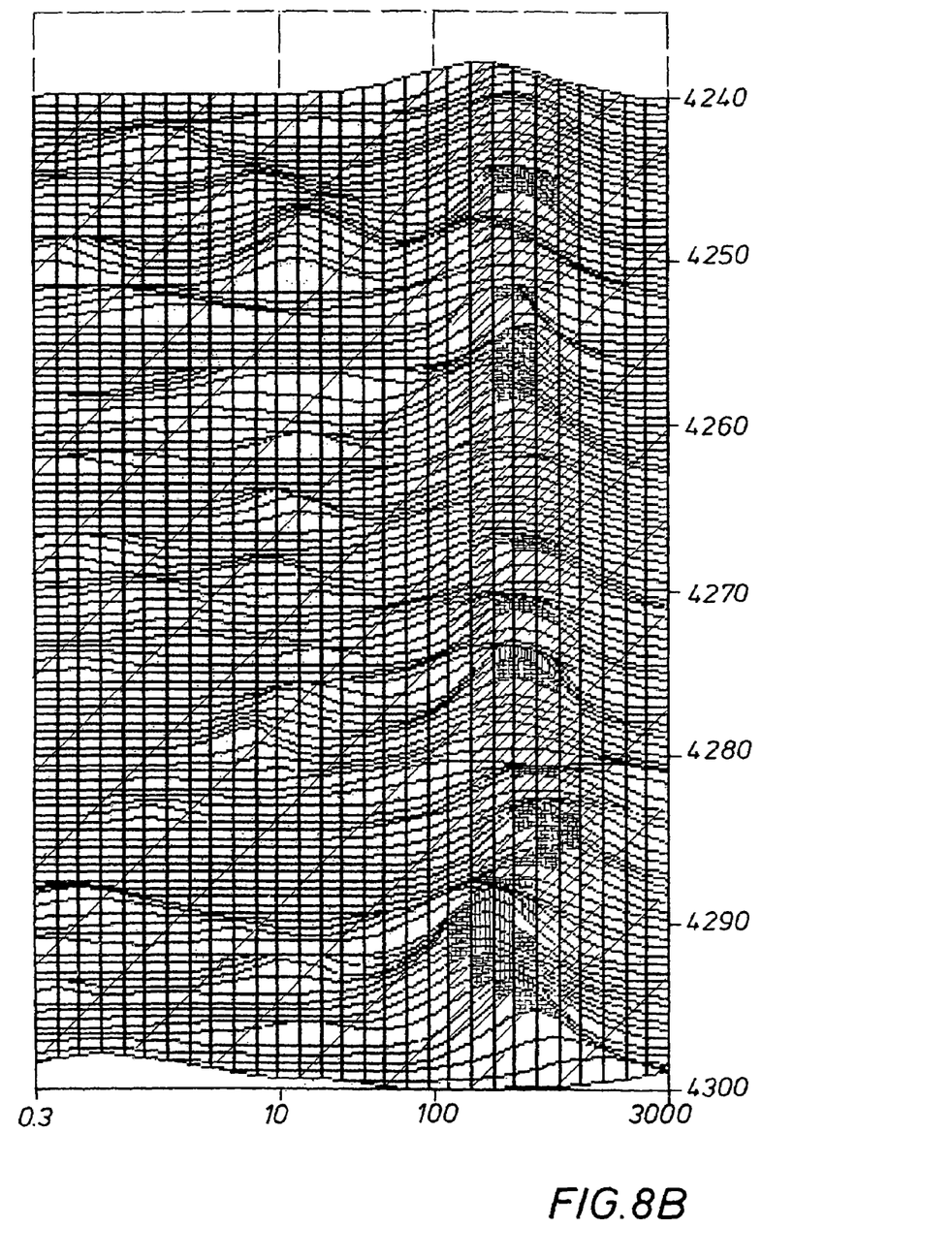

FIG. 8 shows a comparison of the complex distribution of FIG. 6 (labeled "Actual Log") with a reconstructed log consisting of the modeled, simple distributions that are not representative of the bad hole condition. Thus, by identifying the model simple distributions that are spurious, the complex data distribution can be properly reconstructed by summing the simple distributions that are not spurious.

Figure 9:
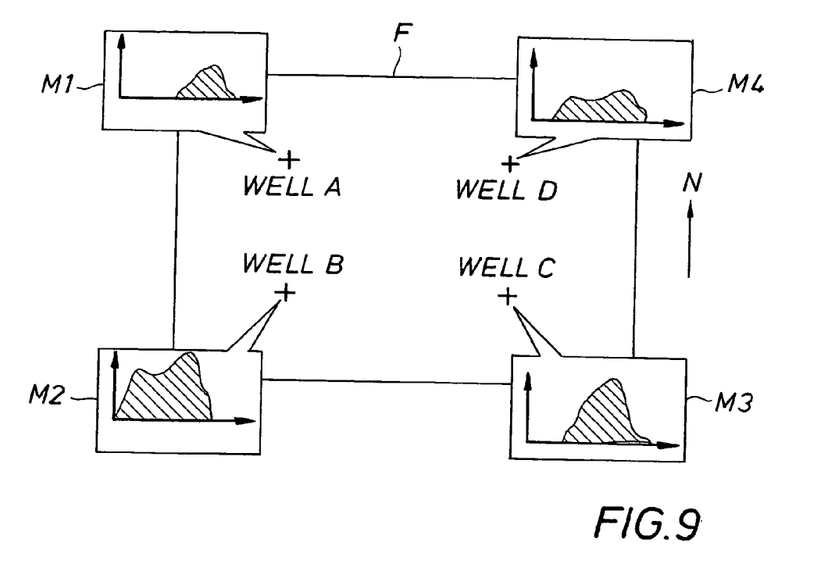
FIG. 9 shows a plan view of four wellbores intersecting a subsurface formation, with four respective local maps representing a complex data distribution of a synthetic formation property measurement for the region of the formation closely surrounding each well.
Figure 10:
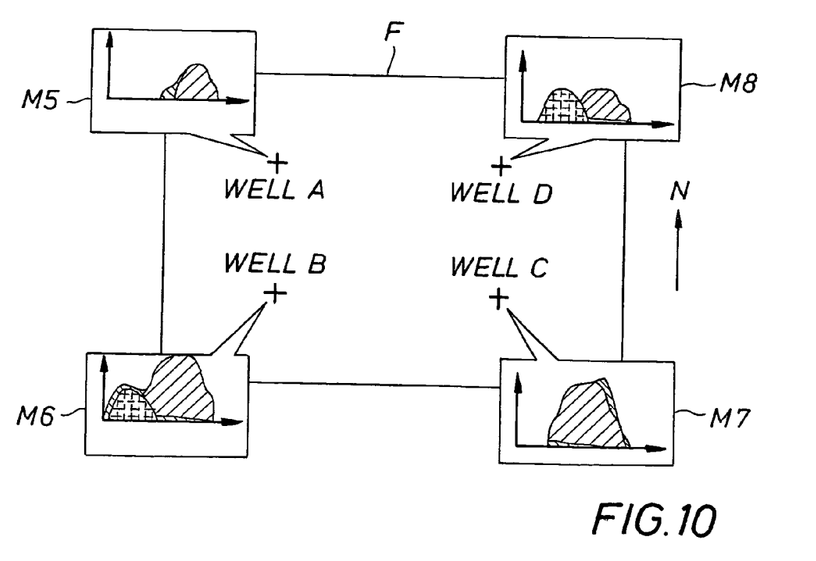
FIG. 10 is similar to FIG. 9, but the complex distribution is modeled in each of the wellbore maps as a sum of two simple distributions in accordance with the present invention.

With reference now to FIGS. 9–12, the present invention may be applied to map portions of the formation using logging measurements and interpolation. FIG. 9, for example, shows a plan view of four wellbores intersecting a subsurface formation F, with four respective maps M1–M4 each representing a complex data distribution of a formation property measurement for the region of the formation closely surrounding each well. Each of the acquired data sets results from respective logging operations in the four wellbores and represents a complex distribution of data that is capable of being modeled as a sum of discrete simple distributions, as illustrated in FIG. 10. Thus, in FIG. 10 the complex distribution in each of the wellbore maps M1–M4 is modeled as a sum of two simple distributions, shown in respective maps M5–M8, in accordance with the present invention.

Figure 11:
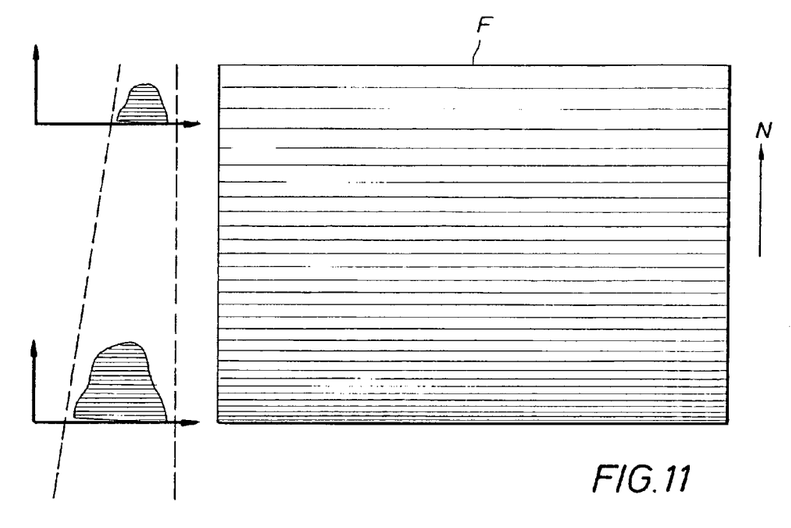
FIGS. 11 and 12 are interpolated maps of discrete parameters represented by the simple distributions, and the trends for such parameters across the formation.
Figure 12:
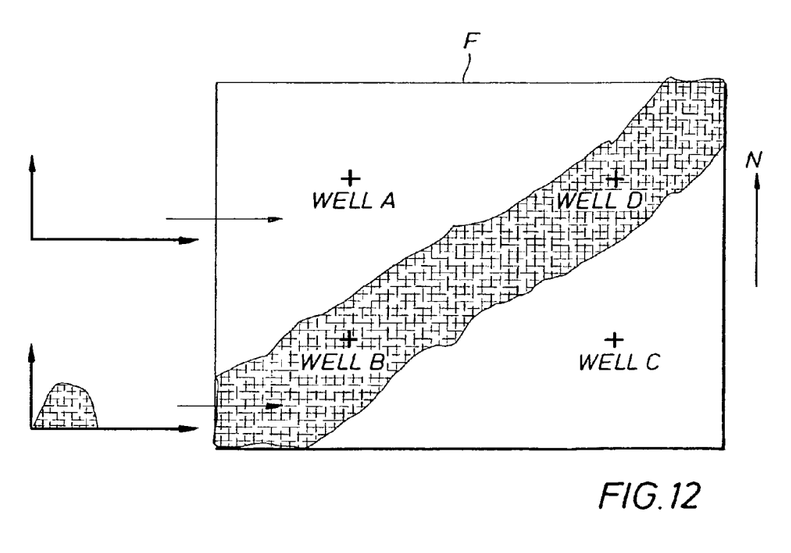

The two simple distributions shown in maps M5–M8 may be independently interpolated over the area between the plurality of wellbores so as to map the simple distributions over at least a portion of the formation, even though interpolation of the original measured property between the wellbores is not straightforward (i.e., it is not, clear how to determine the property distribution at any point (x,y) on the formation map). Accordingly, FIGS. 11 and 12 are maps of discrete parameters represented by the simple distributions, and illustrate the trends for such parameters across the formation. FIG. 11 is, for instance, the result of the original sedimentation process, and it increases (lighter shading to darker shading) from the North to the South. The distribution shown in FIG. 12 is due to diagenesis along a fault zone oriented along a NE-SW diagonal. The property distribution at any point (x,y) on the map can now be determined by adding the two simple distributions at that point. The same logic can be applied to describe, interpret and propagate a property along a well trajectory. Thus, the present invention is also useful for generating 3D maps of relevant formation properties.

It will be further appreciated by those skilled in the art that the formation evaluation tool used for acquiring the complex formation data distribution (or, alternatively, another tool in the tool string) may be equipped with: a means for modeling the complex distribution as a sum of discrete simple distributions; and a means for characterizing each of the simple distributions with a substantially reduced data set. In the case of normal distributions, the reduced data sets each consist of an amplitude, a mean, and a standard deviation. A means, such as the telemetry and power subassembly 38 of FIG. 1, is also operatively connected to the formation evaluation tool for transmitting the substantially reduced data sets to the surface from the wellbore location.

Additionally, the tool string or a surface system may be equipped with a means for independently processing the simple distributions to identify the simple distributions that are spurious. Then, a means such as a general purpose computer located at the surface may be applied for reconstructing the complex distribution without the spurious distributions, in accordance with the present invention.

It will be apparent to those skilled in the art that this invention may be implemented using one or more suitable general-purpose computers having appropriate hardware and programmed to perform the processes of the invention. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment, in the tool, or shared by the two as known in the art. It will also be appreciated that the techniques of the invention may be used with any type of well logging system, e.g. wireline tools, LWD/MWD tools, or LWT tools.

It will be understood from the foregoing description that various modifications and changes may be made in the preferred and alternative embodiments of the present invention without departing from its true spirit. For example: the decomposition can be done in different spaces (porosity, resistivity, resistivity in logarithmic scale, etc.); and the simple distributions can be modeled using Bayesian inversion methods.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

The invention claimed is:

1. A method of transmitting wellbore data from a subsurface location to a surface location, the method comprising the steps of:

acquiring a complex formation data distribution with a formation evaluation tool positioned in the subsurface location;

separating, at the subsurface location, the complex formation data distribution into discrete parameter distributions;

identifying, at the subsurface location, the parameter distributions that are spurious; and transmitting the non-spurious parameter distributions to the surface location for reconstructing the complex formation data distribution.

2. The method of claim 1, wherein each parameter distribution is interpreted independent of other parameter distributions.

3. The method of claim 1, wherein the parameter distribution is selected from the group consisting of an amplitude, a mean, a standard deviation, and combinations thereof.

4. The method of claim 3, wherein each parameter distribution is interpreted independent of other parameter distributions.

* * * * *